United States Patent [19]

Andre et al.

[11] Patent Number: 5,310,240
[45] Date of Patent: May 10, 1994

[54] HOLDING DEVICE FOR VERTICALLY POSITIONING A WINDOW PANE

[75] Inventors: Guy Andre, Saint Savine; Daniel Boville, Paris; Jean-Jacques Legat, St.-Jean de Moirans, all of France

[73] Assignee: A. Raymond & Cie, Grenoble, France

[21] Appl. No.: 873,022

[22] Filed: Apr. 24, 1992

[30] Foreign Application Priority Data

Apr. 27, 1991 [DE] Fed. Rep. of Germany ....... 4113844

[51] Int. Cl.$^5$ ................................................. B60J 1/04
[52] U.S. Cl. .................... 296/201; 296/96.21; 52/208; 52/766
[58] Field of Search ............... 296/201, 96.21, 84.1; 52/208, 766, 768

[56] References Cited

U.S. PATENT DOCUMENTS

| 4,659,138 | 4/1987 | Gösse et al. | 296/201 |
| 4,712,341 | 12/1987 | Harris et al. | 296/201 X |
| 4,779,919 | 10/1988 | Muller | 296/201 |
| 4,912,895 | 4/1990 | Harris, Jr. | 296/201 X |
| 5,152,576 | 10/1992 | Ris | 296/201 |

FOREIGN PATENT DOCUMENTS 3442299 3/1986 Fed. Rep. of Germany.
0230837 12/1989 Fed. Rep. of Germany.

*Primary Examiner*—Joseph D. Pape
*Attorney, Agent, or Firm*—Finnegan, Henderson, Farabow, Garrett & Dunner

[57] ABSTRACT

A holding device for vertically positioning a window pane in the window frame of a motor vehicle, including a retaining part adapted to be secured in a transverse part of the frame, a supporting part moveable with respect to the retaining part and adapted to engage with an edge of the window pane, and a spring acting between the supporting part and the retaining part for urging the supporting part in the direction of the plane of the window pane towards the edge. The retaining part has a pawl pivotally connected to it for movement between a holding position where it engages the supporting part and holds it and the spring in an initial tensioned position and a release position where it is located in a recess in the retaining part and allows the spring to urge the supporting part against the edge of the window pane. The pawl is resiliently biased toward the holding position and located so that it will be pushed into the release position by the window pane as it is being inserted into the window frame.

6 Claims, 4 Drawing Sheets

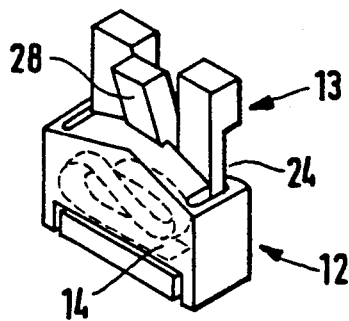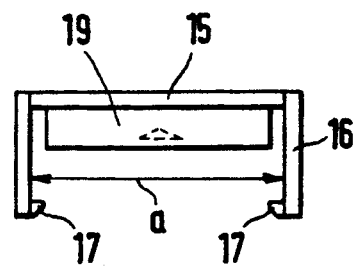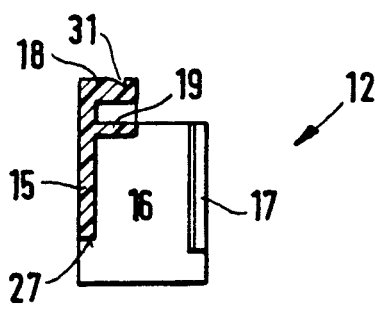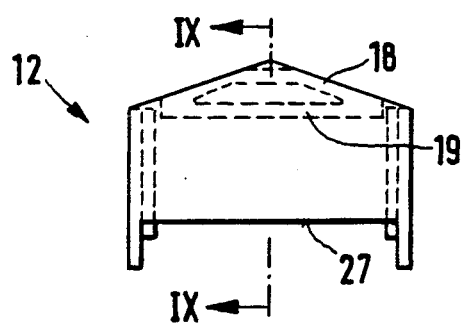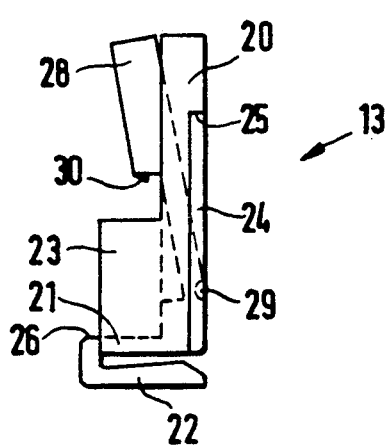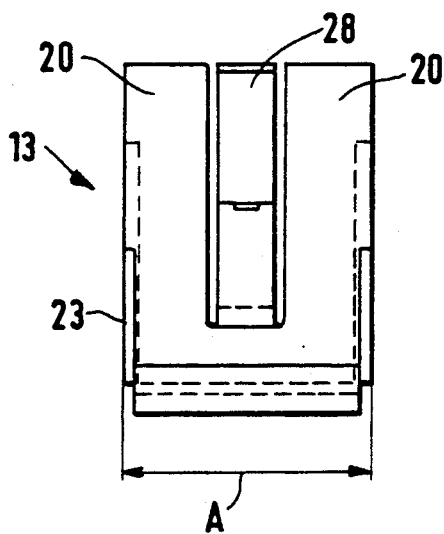

HOLDING DEVICE FOR VERTICALLY POSITIONING A WINDOW PANE

BACKGROUND OF THE INVENTION

This invention relates to a holding device for the vertical positioning of a window pane which can be adhesively bonded in the window frame of a motor vehicle.

Windows which can be adhesively bonded for example windshields or rear windows of motor cars, are usually inserted or laid in place automatically by a free-arm robot. During this operation, the window must be placed at a constant distance from the window frame and temporarily positioned and held in place by holding devices until the adhesive sets or cures. For this purpose, in motor vehicle construction, use is often made of holding devices having supporting parts that are adjustable in the plane of the window. The devices can be inserted in the lower transverse frame of the window and have retaining legs on the supporting parts on which the lower edge of the window rests that are guided for displacement in a direction perpendicular to the edge of the window.

Such a holding device is shown for example, in German Patent No. 34 42 299 C1. The supporting part of this device is provided with a locking device, so that the retaining leg of the supporting part is automatically locked in any desired vertical position once the device has been pressed against the edge of the window.

In the course of increasing automation, a disadvantage of this device is that the supporting parts in each case have to be pressed manually up against the edge of the window, and this involves additional work.

An object of the present invention therefore to design a holding device in such a way that, when laying the window in place, the supporting part of the device will automatically come to bear against the lower edge of the window without the need for any manual step and will then perform its supporting function until the window is held permanently in place by the adhesive.

SUMMARY OF THE INVENTION

This object is achieved in accordance with the present invention by providing a holding device for vertically positioning a window pane in the window frame of a motor vehicle, comprising a retaining part adapted to be secured in a transverse part of the frame, a supporting part moveable with respect to said retaining part and adapted to engage with an edge of the window pane, and a spring acting between the supporting part and the retaining part for urging the supporting part in the direction of the plane of the window pane toward said edge, said retaining part including a pawl pivotally connected to said retaining part for movement between a holding position where it engages the supporting part and holds it and the spring in an initial tensioned position and a release position where it is located in a recess in the retaining part and allows the spring to urge the supporting part against the edge of said window pane, said pawl being resiliently biased toward the holding position and located so that it will be pushed into said release position by the window pane as the pane is being inserted into said window frame.

BRIEF DESCRIPTION OF THE DRAWINGS

Further features which are beneficial and expedient for performing the invention will be seen in the exemplary embodiments of the invention as shown in the drawings, in which:

FIG. 7 shows another embodiment of the holding device, made up of three parts, in perspective and with the spring in a tensioned state;

FIG. 8 is a bottom view of the supporting part of the holding device of FIG. 7;

FIG. 9 is a cross-sectional view of the supporting part taken along the line IX—IX in FIG. 10;

FIG. 10 is a front view of the supporting part;

FIG. 11 is a side view of the associated retaining part of the holding device of FIG. 7;

FIG. 12 is a front view of the retaining part;

DETAILED DESCRIPTION OF THE INVENTION

Figure 3:
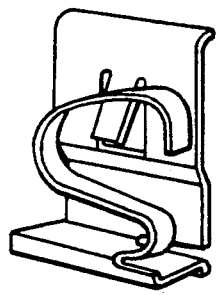
FIG. 3 is a perspective view thereof with the spring untensioned.
Figure 4:
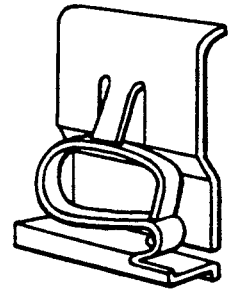
FIG. 4 shows the same device in perspective with the spring tensioned.
Figure 5:
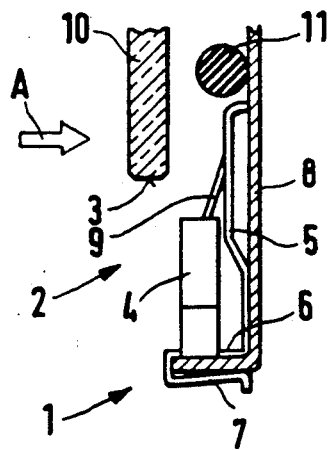
FIG. 5 is a sectional view through the holding device after it has been inserted in a lower window frame with the spring tensioned and before laying the window in place.
Figure 6:
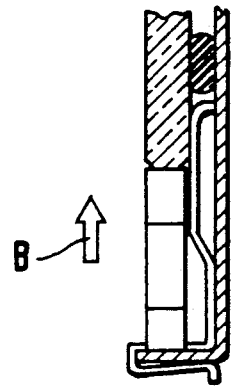
FIG. 6 shows the same installation situation after the window has been laid in place.
Figure 13:
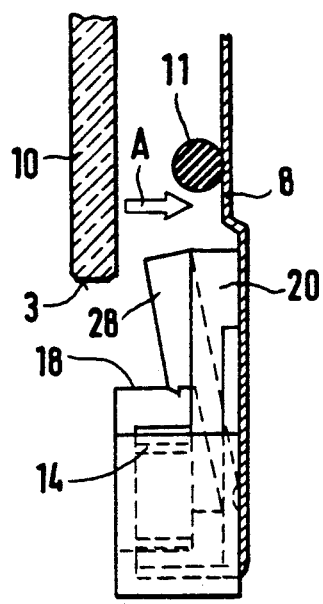
FIG. 13 is a cross-sectional view of the holding device of FIG. 7 assembled and inserted in a window frame in a tensioned state and before the window is laid in place.
Figure 14:
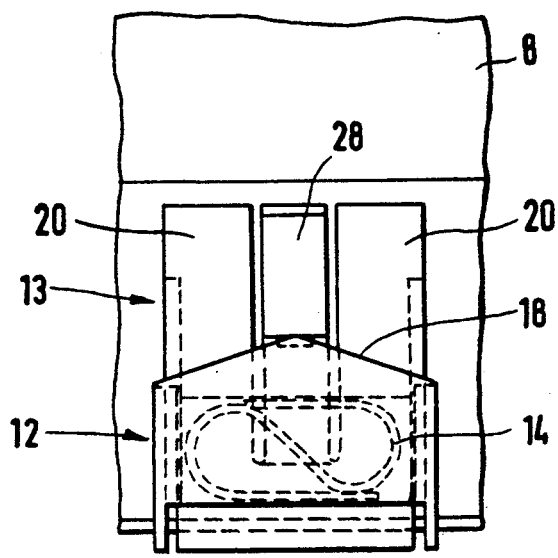
FIG. 14 is a front view of the fitted holding device according to FIG. 13.

The holding device shown in FIGS. 1 to 6 is punched out of one piece of spring steel sheet and shaped into the configuration shown. It essentially comprises a retaining part 1 which can be inserted onto the edge of a lower transverse window frame 8 and a supporting part 2 which can be pressed against the lower edge 3 of a window 10 that is formed by a metal spring leg 4 bent in the form of an S. Retaining part 1 has a rear wall 5, which will lay against the transverse part of a window frame 8, and a supporting leg 6, connected at right angles to the lower end of the rear wall and provided with a downwardly and bent-back clamping leg 7 for securing the retaining part 1 to an edge of the lower transverse window frame 8 (FIGS. 5 and 6).

The spring 4, bent in the form of an S, is connected to supporting leg 6 in such a way that its upper arc 4', which extends approximately across the width of the rear wall 5, forms a supporting rest for the edge 3 of the window 10. In the upper center of the rear wall 5, is a pawl 9 formed out of the wall, which can be resiliently pressed away, that projects outwardly with its free end downward into the supporting region. As shown in FIG. 4, pawl 9 holds spring 4 securely in the compressed state in a tensioned position. FIG. 3 shows the spring 4 in an untensioned position.

In FIG. 5, the holding device with the spring 4 tensioned (i.e. locked under pawl 9) is inserted on the lower transverse frame 8 of the window frame. The window 10 is then brought in the direction of the arrow "A" up to the window frame where it is to be adhesively bonded to the latter by means of a bead of adhesive 11. When the window 10 is pressed into place, pawl 9 will be pressed back away from the lower edge 3 of the window and into wall 5, as a result of which spring 4 will be released so that the upper supporting arc 4, of spring 4 will resiliently move in the direction of the arrow "B" against the lower edge of the window (FIG. 6). With a plurality of such holding devices in the lower transverse frame 8, it is thus possible to hold the window 10 in the necessary position until the bead of adhesive 11 has cured to its full adhesive effect.

In FIGS. 7-12, the holding device is made up of three parts. This device operates on the same principle as described above. The supporting part 12, shown in FIGS. 8-10, is in this case made from plastic, as is the retaining part 13 shown in FIGS. 11 and 12. Only the spring 14, which is needed to press up on the supporting part 12 and, with the holding device assembled, is located inside and therefore represented by broken lines in FIG. 7, is produced from spring steel.

The supporting part 12 in this case comprises a front wall 15 and two side walls 16, which are formed at right angles thereto and are provided at a distance from the wall 15 with inwardly directed locking edges 17, running parallel to the front wall. Provided on the upper edge of the front wall 15 is a supporting wall 18, that is preferably in the shape of a sloped roof. It serves on the one hand as a rest for the lower edge 3 of the window 10 and on the other hand has an inside bearing wall 19 for the spring 14.

Figure 1:
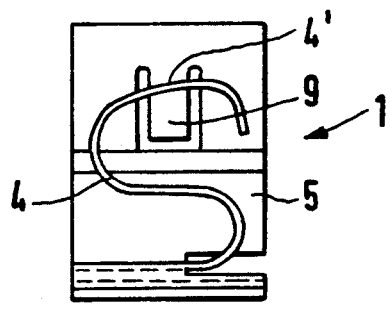
FIG. 1 is a front elevational view of one embodiment of the holding device according to the invention, made completely of metal.
Figure 2:
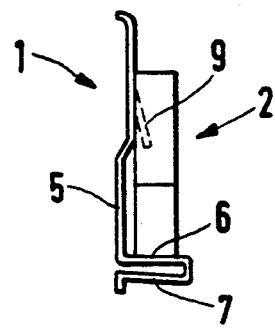
FIG. 2 is a side view of the holding device of FIG. 1.

Similar to the retaining part 1 in FIG. 1, retaining part 13 comprises a rear wall 20, that will bear against the window frame 8, with a supporting leg 21 formed at right angles to the lower end of the rear wall and has a bent-back clamping leg 22 as well as two additional side walls 23, the outer spacing "A" of which is slightly less than the clear spacing "a" between the side walls 16 of the supporting part 12 relative to the retaining part 13. Although these side walls 23 are not absolutely necessary for the supporting function, they are helpful in assembling the holding device to laterally retain the metal spring 14. Formed on the rear side of the rear wall 20, along both edges, is a recess 24, which corresponds in width and depth to the dimensions of the locking edges 17 of the supporting part 12.

Locking edges 17 can lock into these two recesses 24 during assembly of the retaining part 13 and supporting part 12, the locking edges 17 initially having to be pressed over the side walls 23 with the side walls 16 being spread resiliently apart.

At the upper end of the recesses 24 there is a stop edge 25, which limits upward displacement of the supporting part 12 relative to the retaining part 13. In the downward direction, limitation results by the front edge 26 of the supporting leg 21 acting against the lower edge 27 of the front wall 15 of the supporting part 12.

Located in the center of the rear wall 20 of retaining part 13 is a pawl 28, which is pivotally formed out of the rear wall 20 in the lower region by means of a film hinge-like connecting point 29. It has a locking lug 30 on its lower edge that is directed toward the supporting roof 18 and, in the lower position of the supporting part 12, can be locked into a corresponding groove or notch 31 of the upper edge of the supporting roof (FIG. 9). The pawl 28 resiliently projects outwardly with its upper end extending obliquely into the supporting region of the window 10 and can be pressed away resiliently rearward into the space in rear wall 20 like pawl 9 in the first embodiment.

During assembly of the holding device, metal spring 14 is first placed in the niche in retaining wall part 13 between the supporting leg 21 and the two side walls 23. Then, the supporting part 12 is pushed onto the retaining part 13 with the side walls 16 thereof spreading resiliently over the side walls 23 of the retaining part and supporting roof 18 above spring 14. Once the locking edges 17 have locked into the recesses 24, the spring 14 is now completely enclosed and the pawl 28 is in the recess between the two sides of wall 20.

Then the supporting part 12 is pressed downward against the pressure of the spring 14, until the pawl 28 springs out and locks the part in place with its locking lug 30 in the groove or notch 31 in the supporting roof 18.

Figure 15:
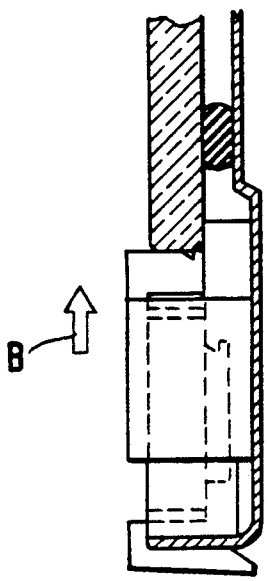
FIG. 15 shows the installation situation of FIG. 13 after the window has been laid in place.
Figure 16:
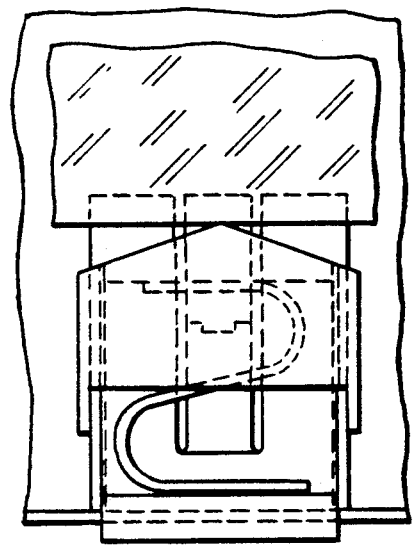
FIG. 16 is a front view showing the holding device and window pane according to FIG. 15.
Figure 17:
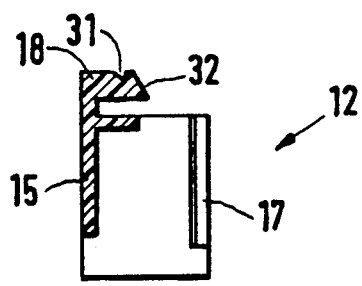
FIG. 17 is a sectional view of an alternative construction for the supporting part of FIG. 7 with a locking lug taken along the line XVII—XVII in FIG. 18.
Figure 18:
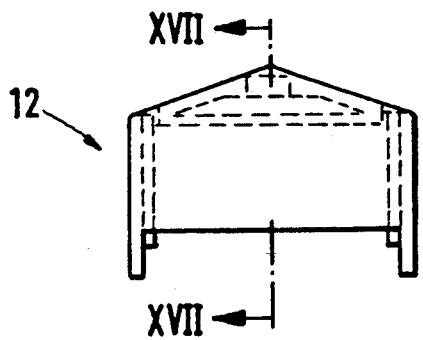
FIG. 18 is a front view of the supporting part of FIG. 17.
Figure 19:
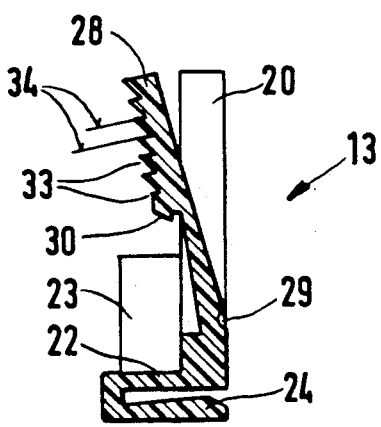
FIG. 19 is a sectional view of the associated retaining part with step-shaped locking grooves taken along the line IXX—IXX in FIG. 20.
Figure 20:
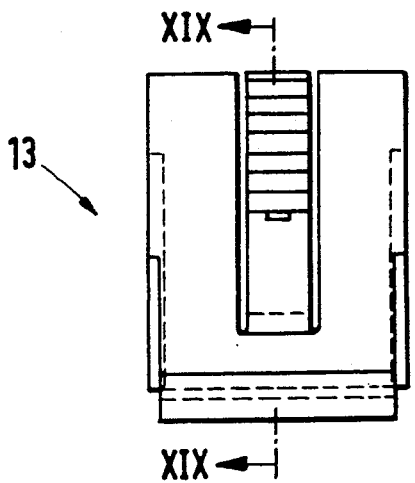
FIG. 20 is a front view of the retaining part of FIG. 19.

At this point, the device is ready for its intended use. As shown in FIGS. 13 to 16, it can be fitted into the window frame 8 of a motor vehicle and used for the temporary holding of a window pane 10 laid in place. When the window 10 is pressed against the bead of adhesive 11 provided in the window frame 8 in the direction of arrow A, the pawl 28 will be pressed away rearwardly. As it does so, locking lug 30 comes out of groove 31 and the supporting part 12 is pushed upward by the force of the spring 14 in the direction of arrow B until the supporting roof 18 bears against the lower edge 3 of the window (FIGS. 15 and 16). The window 10 is then pressed against the upper transverse frame of the window frame (not shown) by the force of the springs 14 in the individual devices and is thereby held in place until the beads of adhesive 11 have set and fully perform their holding function.

Figure 21:
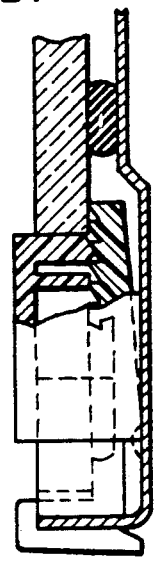
FIG. 21 is a cross-sectional view of the holding device assembled from the supporting and retaining parts of FIGS. 17–20 fitted in the window frame and with the window laid in place.
Figure 22:
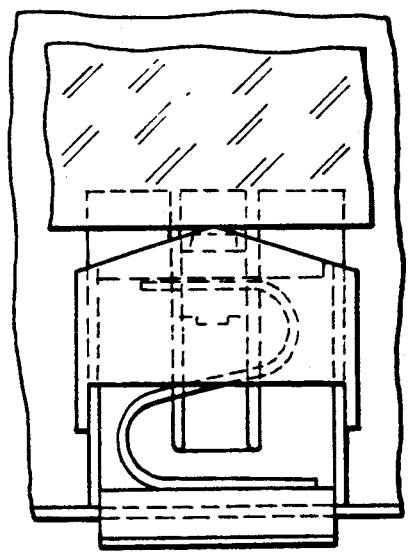
FIG. 22 is a front view of the fitted holding device and window pane according to FIG. 21.

In the case of the alternative embodiment of the invention shown in FIGS. 17 to 22, here the supporting part 12 also has, apart from the groove 31, a locking lug 32, facing the pawl 28 and flattened off on its lower edge. Similarly, pawl 28 is provided in its upper region with a plurality of sawtooth-shaped transverse grooves 33 having upwardly flattened-off locking faces 34. Thus, when the supporting part 12 is pushed up under the force of the spring 14, locking lug 32 will slide up over the transverse grooves 33 until it reaches a transverse groove 33 corresponding to the vertical position of the edge of the window. Then pawl 28 will spring forward and provide a secure locking engagement between locking lug 32 and a transverse groove 33 (FIG. 21).

In comparison with the embodiment described before having a smooth pawl, this embodiment has the advantage that the spring 14 can be weaker and consequently lighter in design because the spring force is no longer needed to hold the weight of the window 10, but only to bring the supporting part 12 into the bearing position. From then on, the locking lug 32 of the supporting roof 18 takes over the supporting function, once it has locked into a transverse groove 33.

The locking connection for the stepwise positioning of the supporting part 12 can also be effected by other suitable locking means on the retaining element which will allow an unhindered upward movement of the supporting part 12 in one direction and in the opposite direction engage in one another by spring force in such a way that the supporting part is held securely in the desired vertical position.

We claim:

1. A holding device for vertically positioning a window pane in the window frame of a motor vehicle, comprising a retaining part adapted to be secured in a transverse part of the frame, a supporting part moveable with respect to said retaining part and adapted to engage with an edge of the window pane, and a spring acting between the supporting part and the retaining part for urging the supporting part in the direction of the plane of the window pane toward said edge, said retaining part including a pawl pivotally connected to it for movement between a holding position where it engages the supporting part and holds it and the spring in an initial tensioned position and a release position where it is located in a recess in the retaining part and allows the spring to urge the supporting part against the edge of said window pane, said pawl being resiliently biased toward the holding position and located so that it will be pushed into said release position by the window pane as the pane is being inserted into said window frame.

2. The holding device of claim 1, which is made of a single piece of sheet metal, the supporting part being the upper arc surface of an S-shaped metal spring integrally connected at its lower arc to the retaining part.

3. The holding device of claim 1, wherein the supporting and retaining parts are separate pieces and including means for guiding movement of the supporting part with respect to the retaining part in the direction of the plane of the window pane, and stop means on the retaining part for limiting movement of the supporting part in both directions.

4. The holding device of claim 3, wherein the supporting part has a front wall and two side walls with free ends formed at right angles therewith and the retaining part includes a rear wall extending upwardly in the direction of the plane of the window pane and a clamping leg extending at right angles from lower end of the rear wall that engages with said window frame, said guide means including inwardly directed locking edges on the free ends of the side walls of the supporting part that engage behind the rear wall of the retaining part to permit relative sliding movement between said parts, the supporting part having a roof-shaped supporting surface that engages with the lower edge of the window and an inner bearing wall, said spring acting between said bearing wall of the supporting part and the clamping leg of the retaining part.

5. The holding device of claim 4, wherein the pawl has a locking lug directed toward the supporting roof that locks into a corresponding groove in the supporting roof to hold the supporting part and spring in said tensioned position.

6. The holding device in claim 4 or 5, wherein the supporting roof also has a locking lug, facing the pawl with a lower locking edge and the pawl has a plurality of sawtooth-shaped transverse grooves having upwardly flattened off locking faces adapted to engage with the locking edge of said supporting roof locking lug.

* * * * *